(12) United States Patent
Tabellini

(10) Patent No.: US 6,668,901 B2
(45) Date of Patent: Dec. 30, 2003

(54) DEVICE FOR CONNECTING THE PROTECTIVE PLATES ON BELLOWS COVERING THE GUIDES OF AUTOMATIC MACHINES, MACHINE TOOLS AND ROBOTS

(75) Inventor: Giorgio Tabellini, Sasso Marconi (IT)

(73) Assignee: P.E.I. Protezioni Elaborazioni Industriali S.r.l., Bologna (IT)

( * ) Notice: Subject to any disclaimer, the term of this patent is extended or adjusted under 35 U.S.C. 154(b) by 0 days.

(21) Appl. No.: 10/059,734

(22) Filed: Jan. 29, 2002

(65) Prior Publication Data

US 2002/0100344 A1 Aug. 1, 2002

(30) Foreign Application Priority Data

Jan. 31, 2001 (IT) ..................... BO2001A0048

(51) Int. Cl.[7] ................................ E06B 3/12
(52) U.S. Cl. ........................ 160/223; 74/608
(58) Field of Search ............... 160/223, 229.1, 160/218, 220, 222, 84.01, 84.04, 202; 384/15, 16; 74/608, 612, 616; 409/134

(56) References Cited

U.S. PATENT DOCUMENTS 3,824,890 A * 7/1974 Zettler et al. ............... 409/134
4,596,162 A    6/1986 Walter et al.
6,422,290 B1 * 7/2002 Tabellini ..................... 160/202
6,431,249 B1 * 8/2002 Tabellini ..................... 160/222

FOREIGN PATENT DOCUMENTS

DE           36 35 874 C2    5/1988

* cited by examiner

Primary Examiner—David Purol
(74) Attorney, Agent, or Firm—Fay, Sharpe, Fagan, Minnich & McKee, LLP

(57) ABSTRACT

A connecting device rotatably joins a protective plate to a bellows that covers the guide of an automatic machine, machine tool or robot. The plate is one of a plurality of partially overlapping protective plates that slide and turn relative to each other as the bellows is extended and compressed. The connecting device includes a pushing element designed to extend freely through an aperture made in the respective plate and to come into contact with an outside face of the plate itself; a joining element which can be stably connected to the bellows at a respective transversal fold line and which is designed to come into contact with an inside face of the respective plate so as to rotatably support the plate in removable, pivot-like fashion when the plate is pushed by the pushing element; and a pair of helical springs forming a single component with the pushing element and stably connected to the joining element.

20 Claims, 2 Drawing Sheets

DEVICE FOR CONNECTING THE PROTECTIVE PLATES ON BELLOWS COVERING THE GUIDES OF AUTOMATIC MACHINES, MACHINE TOOLS AND ROBOTS

BACKGROUND OF THE INVENTION

The present invention relates to a device for connecting the protective plates on bellows covering the guides of automatic machines, machine tools and robots.

Conventional protective bellows usually comprise a folding cover made by suitably folding a flexible material, such as a synthetic fabric, for example. The folding cover is sealed or glued at its transversal folds to a frame inside the bellows. The frame consists of a plurality of ribs or braces made of a relatively rigid material. The ribs are designed to strengthen the folding cover and to give it the required shape inside and outside, according to the type of guide to be protected.

The bellows is fitted over the guide of the automatic machine, machine tool or robot and joined at one end by a connecting flange to a slide that runs in the guide. With its folding cover, the bellows thus covers and protects the guide. As the slide runs backwards and forwards in the guide, the bellows connected to it at one end is compressed and extended in the corresponding direction of motion.

In all automatic machines, especially machine tools and similar types of machinery, where sharp or hot chippings, abrasive powders and corrosive liquids are always present, it is essential to protect the outside surface of the folding cover with protective plates. These plates, which may be made of plastic or metal, are usually connected to the folding cover at the edges of the strengthening ribs by means of joining elements. The joining elements must not only ensure that the plates remain firmly connected to the bellows but must also allow the plates to turn freely relative to the bellows.

The present specification refers to bellows extending in a substantially horizontal direction but without thereby restricting the scope of the invention.

One of the easiest ways of connecting the plates to the bellows is to use U-shaped metal clips. Each clip is applied and fastened to the respective plate with one leg inserted in an aperture made in the edge of the plate and the other leg hooked over the upper edge of the respective strengthening rib. Each clip thus constitutes a sort of hinge for the corresponding plate.

When the slide moves forward, dragging the bellows along with it in such a way as to extend it, the protective plates are positioned in series, one after the other, and lie in a substantially horizontal plane parallel to the upper surface of the folding cover. The plates are partially overlapped in such a way that they can slide over one another. During the return travel of the slide, corresponding to the shortening or compression of the bellows, the plates, in addition to sliding over each other, must be able to turn by approximately 90 degrees in such a way as to be positioned one on top of the other so that they are perpendicular to the upper surface of the folding cover when the bellows is in the position of maximum compression.

The clip is simple in structure and effective in fastening the protective plate to the bellows and allowing the plate to turn relative to the bellows. However, when the bellows moves from the compressed position to the extended position, the clip does not facilitate the return movement of the plate from the turned position where it is substantially perpendicular to the upper surface of the folding cover to the horizontal position where it is parallel to the upper surface of the folding cover. Moreover, substituting a damaged or broken plate requires considerable time and effort.

To overcome the drawbacks mentioned above, several solutions have been proposed. Two of these are described below.

German patent No.3 635 874 teaches the use, as a connecting device, of a hinge that comprises a central portion and two lateral portions on each side of the central portion. Both the central portion and the lateral portions have tubular bodies crossed by a single connecting pin which allows the lateral portions to turn freely relative to the central portion.

The central portion has two legs extending from its tubular body and is designed to be fixed to the bellows with a leg on each side of one of the transversal folds of the bellows.

Each of the two lateral portions also has two legs extending from its tubular body and designed to be fixed to one of the plates with a leg on each side of the plate itself.

The plates are held in contact with each other by return springs located between the central portion and the lateral portions of each hinge.

Hinges made in this way, however, are complex, heavy and expensive and do not greatly facilitate the task of changing the plates.

U.S. Pat. No. 4,596,162 discloses a connecting device consisting of a tape that is substantially the same in length as the protective plate. One longitudinal edge of the tape is fixed to a wall of the bellows and the other longitudinal edge is fixed to the plate. The tape is made of a flexible material and its central longitudinal portion remains slack to allow the plate to turn relative to the bellows.

This solution, too, is difficult to implement and does not solve the problem of enabling a damaged plate to be changed easily.

The aim of the present invention is to provide a device for connecting the protective plates of a covering bellows that is free of the above mentioned drawbacks.

SUMMARY OF THE INVENTION

Accordingly, the present invention provides a device for connecting the protective plates of a bellows that covers the guide of an automatic machine, machine tool or robot; the bellows being designed to be extended and compressed longitudinally in a defined direction around a plurality of transversal fold lines; the protective plates being designed to be rotatably joined, each by at least one such connecting device, to the transversal fold lines in such a way as to partially overlap each other in series in a plane that is substantially parallel to a face of the bellows when the bellows is in the extended position and so as to be able to slide and turn relative to each other as the bellows is extended and compressed; the connecting device comprising: a joining element which can be stably connected to the bellows at a respective transversal fold line and which is designed to come into contact with at least one face of the plate; at least one pushing element designed to come into contact with at least one face of the plate; and elastic means located between the joining element and the pushing element.

BRIEF DESCRIPTION OF THE DRAWINGS

The invention will now be described with reference to the accompanying drawings which illustrate a preferred embodiment of it and in which.

DESCRIPTION OF THE PREFERRED EMBODIMENTS

Figure 1:
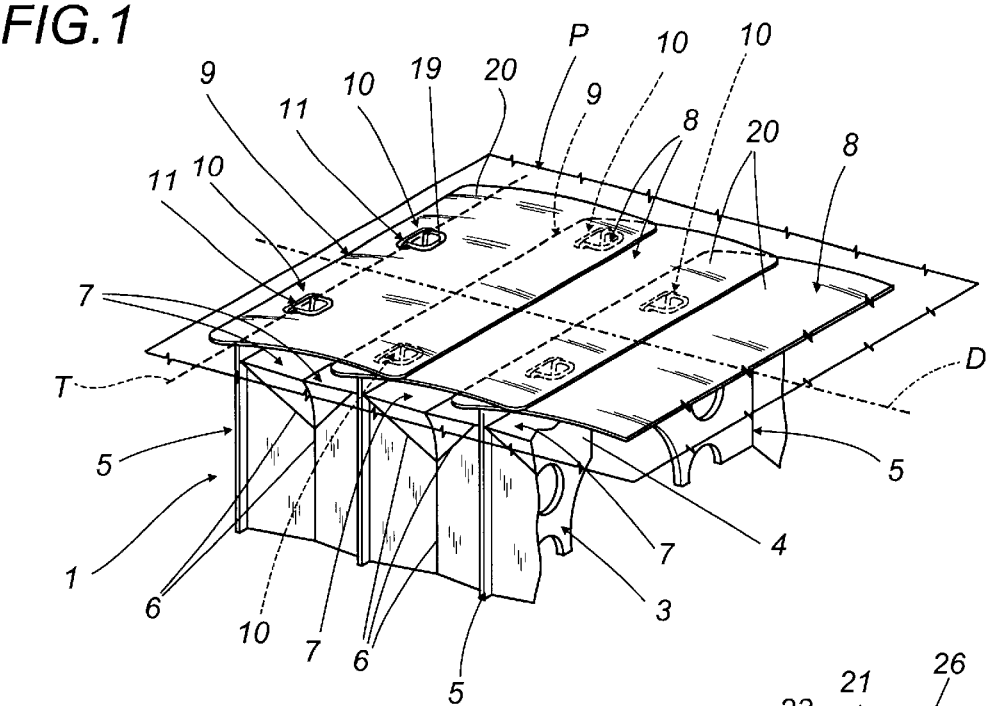
FIG. 1 is a schematic perspective view of a covering bellows, in the extended position, equipped with protective plates, each plate being joined to the bellows itself by a pair of connecting devices made according to the present invention.

With reference to FIG. 1, the numeral 1 denotes in its entirety a bellows used for covering the guides (not illustrated) of automatic machines, machine tools or robots.

The bellows 1 has on the outside of it a folding cover 2 made of a flexible fabric and, on the inside of it, a plurality of rigid strengthening braces 3 which are substantially parallel to each other, each with a crosspiece 4 supporting the folding cover 2, and which are delimited at the ends by edges 5.

The fabric of the folding cover 2 is folded in concertina fashion along the transversal fold lines 6 and glued or sealed to the edges 5 of the braces 3, in such a way as to form, on the bellows 1, a main foldable covering face 7 that is internally supported by the crosspieces 4. In particular, the folding cover 2 is glued or sealed to the edges 5 of the crosspieces 4 along defined transversal fold lines 6 that are parallel to each other.

The bellows 1, being connected at one end to a slide (not illustrated) and at the other end to a fixed point of the machine, can be stretched lengthways along the aforementioned guide in a defined direction D parallel to the face 7, during the forward movement of the slide, and contracted lengthways in the same direction D during the return movement of the slide. The stretching and contraction of the bellows 1 are the result of the extension and compression of the bellows 1 itself around the transversal fold lines 6.

To protect the face 7 of the bellows 1, for example from sharp or hot chippings, abrasive powders or corrosive liquids, the bellows 1 is equipped with protective plates 8 made of metal or plastic.

Figure 4:
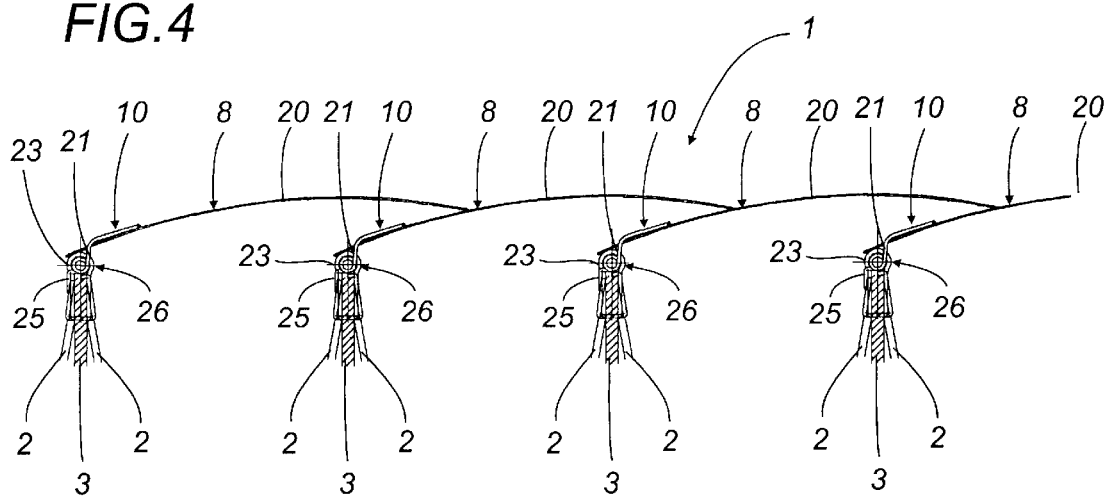
FIG. 4 is a lateral section view, with some parts cut away for clarity, of the device shown in FIG. 1.

The plates 8 are connected to the bellows 1 with their longitudinal edges 9 against the respective edges 5 of the crosspieces 4, in such a way that, when the bellows 1 is in the extended position (FIGS. 1 and 4), the plates 8 are positioned in series, one after the other, and lie in a plane P substantially parallel to the face 7 of the bellows 1. When they are in this position, the plates 8 partially overlap each other and each is rotatably joined to the bellows 1 at one of the fold lines 6 on the edge 5 of a crosspiece 4 by a pair of connecting devices 10 in such a way that it can slide and turn relative to the other plates 8 during the extension and compression of the bellows 1.

The plates 8 have a slightly rounded profile, with the concave face towards the inside of the bellows 1.

The connecting devices 10 of each plate 8 are associated to respective apertures 11 made in the plate 8 itself. The apertures 11 are arranged symmetrically along and close to the longitudinal edge 9 and are spaced from each other in a direction T transversal to the direction D in such a way that those made in any one given plate 8 are offset, relative to the direction D, from the apertures 11 made in the plate 8 adjacent to it on both sides.

As shown in more detail in FIGS. 3 to 6, each connecting device 10 comprises a joining element 12, that is stably connected to the bellows 1 at the edge 5 of a respective crosspiece 4 and is positioned over the corresponding fold line 6 and over the edge 5 itself. The fixed, inseparable connection of the element 12 to the bellows 1 may be achieved by gluing and/or sealing, for example, heat sealing, of the element 12 to the fabric of the folding cover 2 or by a pressed, interference fit.

Looking in more detail, the element 12 is substantially U-shaped and has a central portion 13 positioned on the folding cover 2 over the corresponding fold line 6 and two legs 14 and 15 extending from, and as a single component with, the central portion 13 and designed to grip the bellows 1 by the fold line 6. The portion 13 is substantially in the shape of a cylindrical tube divided in half lengthways, whilst each of the legs 14 and 15 consists of a respective flat surface.

The leg 14 has two through holes 16 spaced and aligned with each other in a direction R parallel to the aforementioned direction T, whilst the leg 15 has a single central hole 17 lying between the holes 16, being larger in the direction R than the holes 16 and being positioned closer to the central portion 13 than the holes 16, extending slightly over the portion 13 itself.

The gripping of the bellows 1 is facilitated by a tab 28 extending inside the element 12 from an edge of the hole 17 on the other side of the central portion 13, and by four teeth 29 extending in pairs inside the element 12 from respective edges of the legs 14 and 15 on the other side of the portion 13.

As shown in more detail in FIGS. 2, 4, 5 and 6, each connecting device 10 further comprises a pushing element 18 having a cylindrical section and bent in such a way as to have a flat central portion substantially in the shape of a U.

Figure 5:
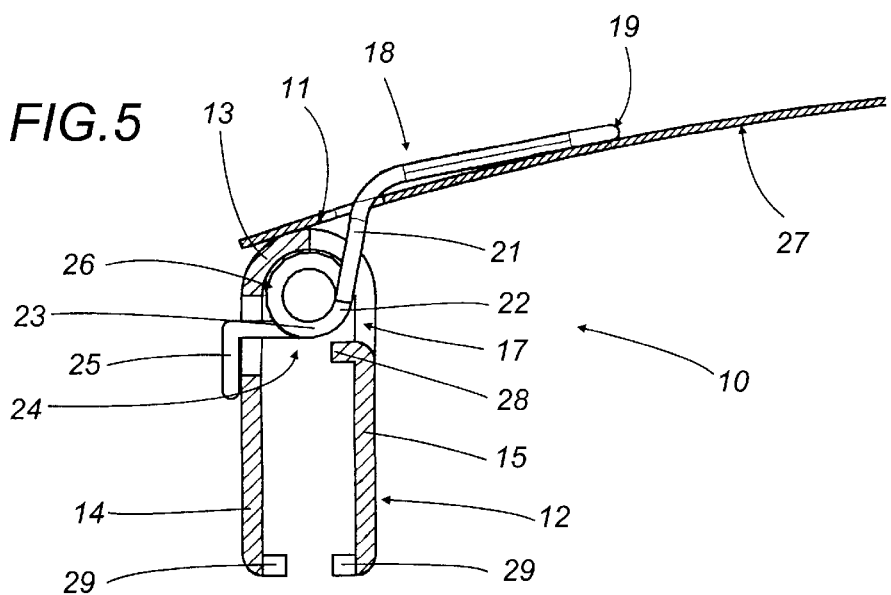
FIG. 5 is a scaled-up view of a detail from FIG. 4.
Figure 6:
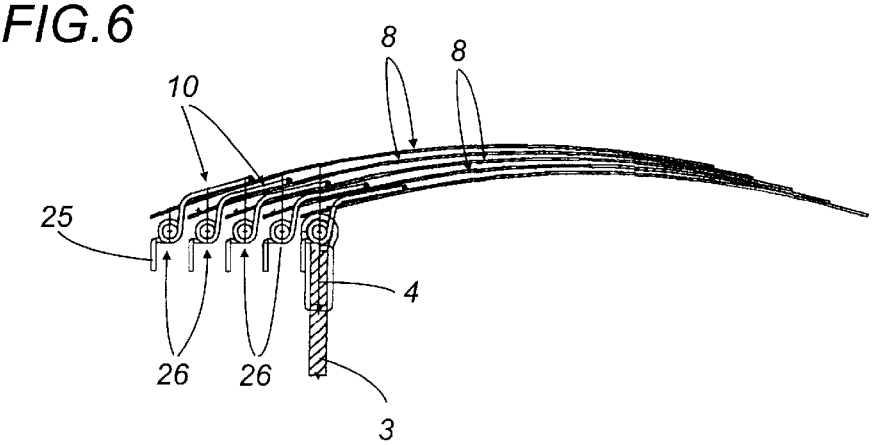
FIG. 6 is a lateral section view, with some parts cut away for clarity, of the device shown in FIG. 1, but with the covering bellows in the compressed position.

As shown in FIGS. 1 and 5, the portion 19 is positioned substantially parallel to an outside face 20 of the plate 8, in contact with the face 20 itself, close to the aperture 11, and extends towards the center of the plate 8.

Figure 2:
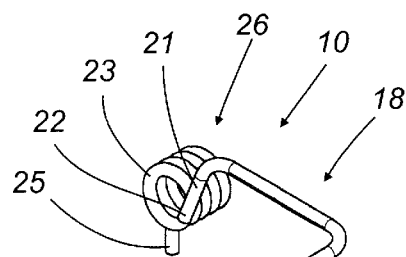
FIG. 2 is a scaled-up, perspective view, with some parts cut away for clarity, of a first detail of the connecting device shown in FIG. 1.
Figure 3:
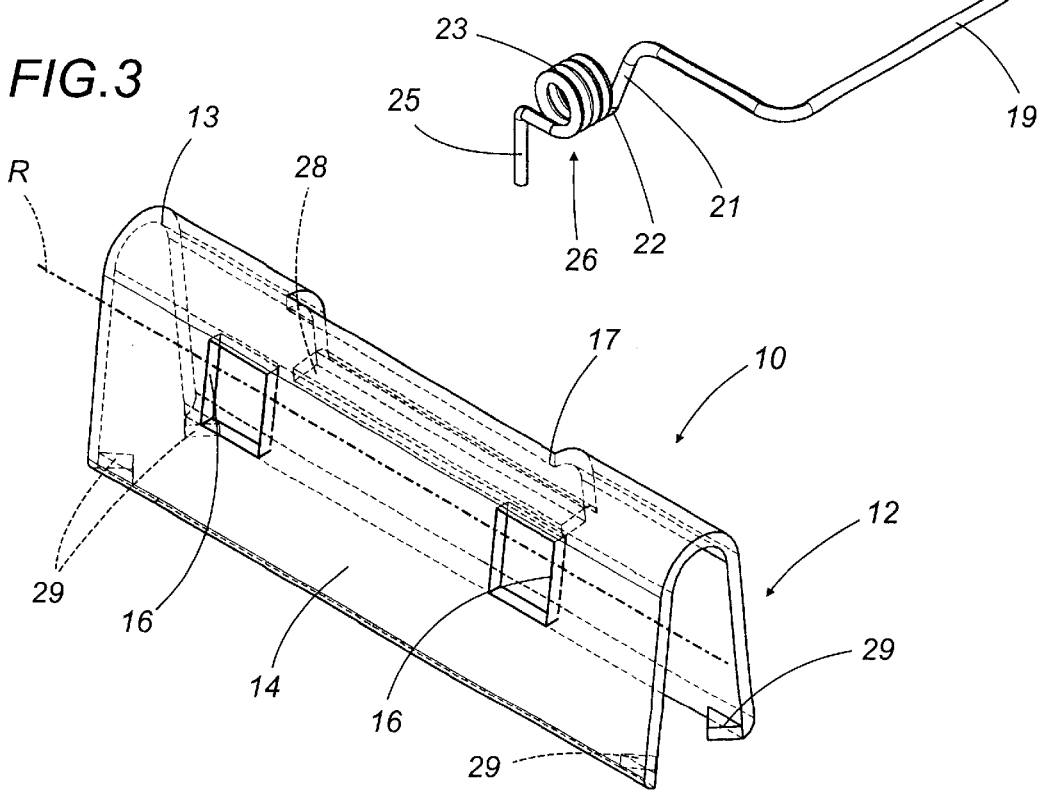
FIG. 3 is a scaled-up, perspective view, with some parts cut away for clarity, of a second detail of the connecting device shown in FIG. 1.

As better illustrated in FIG. 2, the pushing element 18 also presents two ends 21, each of which forms an extension of the central portion 19 running transversal to the plane in which the portion 19 lies.

The ends 21 extend freely through the aperture 11 and through the hole 17 in the joining element 12 and each is connected as a single component to a first end 22 of a helical spring 23 housed inside the element 12. Looking in more detail, the spring 23 is housed in a seat 24 delimited by the inner surface of the central portion 13.

Each spring 23 is located at an intermediate position between the hole 17 and a respective hole 16 and has a shaped second end 25 that is stably connected to the joining element 12. Looking in more detail, the end 25 passes through the hole 16 and is hooked stably to the outside of the leg 14 (FIG. 5).

The springs 23 constitute elastic means 26 positioned between the joining element 12 and the pushing element 18 in such a way as to enable the plate 8 to turn about the aforementioned plane P during the extension and compression of the bellows 1 and at the same time to exert pressure on the plate 8 to keep the plates 8 in contact with each other. In particular, the elastic means 26 exert on the plate 8 a returning moment in the form of an opposing spring thrust generated by the rotation of the plate 8 when the bellows 1 is compressed.

As shown in FIG. 5, the pushing element 18 and the joining element 12 are in contact with the plate 8 respectively at its outside face 20 and at an inside face 27 opposite the face 20.

In this way, the joining element 12 rotatably supports the plate 8 in removable, pivot-like fashion when the plate 8 is pushed by the pushing element 18. At the same time, the plate 8 is linked in removable, lever-like fashion to the joining element 12 under the action of the pushing element 18 and of the elastic means 26. From the foregoing description, it is clear that any of the plates 8 can be changed without special tools and even if there is very little space beside the bellows 1. Indeed, any plate 8 can be easily changed from outside the bellows 1 by simply unfastening the element 12 and the element 18 and simultaneously removing the element 18 from the aperture 11. Obviously, the plate 8 can just as easily be fitted to the device 10 by following inversely the removal procedure just described.

The invention described can obviously be subject to modifications and variations without departing from the scope of the inventive concept, and, moreover, all the details of the invention may be substituted by technically equivalent elements.

Thus, the pushing element 18 need not be U-shaped but may have any shape suitable for pressing the plate 8 against the plate 8 following it. For example, it may simply be a flat tab. Further, whatever its form, the element 18 may be curved in order to match the convexity of the plate 8.

In another embodiment that is not illustrated, each plate 8 has a single aperture 11 made in it and is connected by a single connecting device 10. Whatever their form, the plates 8 need not be shaped in a specific or complicated way but need only have small aperture 11 made in it. The bellows 1 may extend in a horizontal, vertical or even oblique direction provided only that, if it extends in a vertical or oblique direction, the thrust exerted by the pushing element 18 on each plate 8 is very important and must keep it pressed at all times against the plate 8 following it.

What is claimed is:

1. A device for connecting protective plates of a bellows that covers a guide of an automatic machine, machine tool or robot; the bellows being extendible and compressible in a defined direction around a plurality of transversal fold lines, and having protective plates rotatably joined, each by at least one connecting device, to the transversal fold lines to partially overlap each other in series in a plane that is substantially parallel to a face of the bellows when the bellows is in the extended position and adapted to slide and turn relative to each other as the bellows is extended and compressed; the connecting device comprising:

a joining element connected to the bellows at a respective transversal fold line, the joining element being engageable to at least one face of the plate;

at least one pushing element engageable to at least one face of the plate; and an elastic element located between the joining element and the pushing element.

2. The device according to claim 1, wherein the joining element and the pushing element are engageable to opposite faces of the protective plate; the joining element rotatably supporting the plate when the plate is pushed by the pushing element; the joining element, the pushing element and the elastic element acting in conjunction with each other to exert a combined elastic thrust which keeps the protective plates pressed against each other as the bellows is extended and compressed.

3. The device according to claim 2, wherein the protective plate is linked in removable, lever-like fashion to the joining element under the action of the pushing element and of the elastic element.

4. The device according to claim 2, wherein the joining element, the pushing element and the elastic element act in conjunction with each other to exert on the protective plate an opposing spring thrust during the rotation of the plate following the compression of the bellows.

5. The device according to claim 1, wherein the pushing element extends freely through an aperture made in the protective plate.

6. The device according to claim from 1, wherein the elastic element comprises at least one helical spring.

7. The device according to claim 6, wherein the pushing element has two ends, each connected to a first end of a respective spring.

8. The device according to claim 7, wherein the pushing element forms a single component with the springs.

9. The device according to claim 2, wherein each spring has a second end that is stably connected to the joining element.

10. The device according to claim 7, wherein the joining element is substantially U-shaped and has a central portion accommodating the springs and two legs extending from the central portion to grip the bellows by the respective transversal fold line.

11. The device according to claim 10, wherein the joining element has a first through hole through which the two ends of the pushing element are connected to the first end of the respective spring.

12. The device according to claim 9, wherein the joining element has a pair of second through holes located on opposite sides of the first hole relative to the central portion; the second end of each spring passing through one of the respective second holes; and the second end being hooked stably to one of the legs of the joining element.

13. The device according to claim 1, wherein the pushing element has a central portion that is substantially U-shaped and that is positionable substantially parallel to the respective protective plate.

14. The device according to claim 1, wherein each protective plate has at least two apertures made in it, the apertures being spaced from each other in a direction transversal to the direction in which the bellows is extended and compressed.

15. The connecting device according to claim 14, wherein the apertures made in any one given protective plate are offset, relative to the direction in which the bellows is extended and compressed, from the apertures made in the protective plate adjacent to it on both sides.

16. The device according to claim 3, wherein the joining element, the pushing element and the elastic element act in conjunction with each other to exert on the protective plate an opposing spring thrust during the rotation of the plate following the compression of the bellows.

17. The device according to claim 2, wherein the pushing element is designed to extend freely through an aperture made in the protective plate.

18. The device according to claim 2, wherein the elastic element comprises at least a helical spring.

19. The device accord to claim 8, wherein each spring has a second end that is stably connected to the joining element.

20. The device according to claim 8, wherein the joining element is substantially U-shaped and has a central portion accommodating the springs and two legs extending from the central portion to grip the bellows by respective transversal fold line.

* * * * *